United States Patent [19]

Suzuki et al.

[11] Patent Number: 5,295,459
[45] Date of Patent: Mar. 22, 1994

[54] CAMSHAFT DRIVE FOR V-TYPE OR HORIZONTALLY OPPOSED ENGINE

[75] Inventors: Tadasu Suzuki, Chicopee; Morikazu Asada, South Hadley, both of Mass.

[73] Assignee: Tsubakimoto Chain Co., Osaka, Japan

[21] Appl. No.: 114,195

[22] Filed: Aug. 30, 1993

[30] Foreign Application Priority Data

Aug. 31, 1992 [JP] Japan ........................ 4-066168[U]

[51] Int. Cl.$^5$ ............................................. F01L 1/02
[52] U.S. Cl. ................................................. 123/90.31
[58] Field of Search ................................. 123/90.31

[56] References Cited

U.S. PATENT DOCUMENTS

| | | | |
|---|---|---|---|
| 5,010,859 | 4/1991 | Ogami et al. | 123/90.31 |
| 5,014,655 | 5/1991 | Ampferer | 123/90.31 |
| 5,033,421 | 7/1991 | Shimada et al. | 123/90.31 |
| 5,178,108 | 1/1993 | Beaber | 123/90.31 |
| 5,216,989 | 6/1993 | Iwata et al. | 123/90.31 |

FOREIGN PATENT DOCUMENTS 186917  8/1988  Japan ........................ 123/90.31

Primary Examiner—E. Rollins Cross
Assistant Examiner—Weilun Lo
Attorney, Agent, or Firm—Howson & Howson

[57] ABSTRACT

A camshaft driving device for a V-type engine or a horizontal opposed engine, staggers the times of the collisions of one crankshaft sprocket and one chain or other and the collisions of another crankshaft sprocket and another chain to reduce overall engine noise. Two crankshaft sprockets, mounted on the crankshaft, are angularly related to each other so that when the meshing starting point on the tension side of one crankshaft sprocket one chain is radially aligned with a top land of the one sprocket, the meshing starting point on the tension side of the other crankshaft sprocket and the other chain is aligned with a bottom land of the last-mentioned sprocket.

1 Claim, 3 Drawing Sheets

CAMSHAFT DRIVE FOR V-TYPE OR HORIZONTALLY OPPOSED ENGINE

BRIEF SUMMARY OF THE INVENTION

This invention relates generally to camshaft drives, and more particularly to improvements in camshaft drives utilizing endless, flexible elements such as chains, toothed belts or the like. The invention has particular utility in the driving of multiple camshafts from a single crankshaft in an automotive engine of the V-type or horizontally opposed type.

In a typical overhead cam, V-type or horizontally opposed internal combustion engine, each line of cylinders has one or more camshafts. Each camshaft has a sprocket so that it can be driven by a chain or toothed belt. Two crankshaft sprockets are mounted on the engine crankshaft and each crankshaft sprocket is connected in driving relationship to the camshaft sprocket or sprockets associated with one line of cylinders through a chain or belt. In a conventional engine, the two crankshaft sprockets are connected to the crankshaft in the same phase, for convenience in engine fabrication. Therefore the relation between the meshing timing of the two crankshaft sprockets with their respective chains or belts is not taken into consideration. As the crankshaft rotates, collision sounds of the crankshaft sprockets and their respective chains or belts additively interfere, and consequently, total engine noise is increased.

The principal object of this invention is to provide a camshaft driving device which reduces total engine noise.

In accordance with the invention, total engine noise is reduced by shifting the meshing timing of one crankshaft sprocket and one chain relative to the meshing timing for the other crankshaft sprocket and chain. This is achieved by a special relationship between the mesh starting points on the tension sides of the crankshaft sprockets. The mesh starting point on the tension side of a sprocket is point at which a straight line extending along the length of the tension side of the chain intersects a radius of the sprocket perpendicularly. The position of the mesh starting point can easily be determined on the basis of a wrapping angle of the chain on the crankshaft sprocket.

The tension side mesh starting points of the two crankshaft sprockets are disposed relative to each other so that, when the radius intersecting the mesh starting point for one sprocket extends through a top land of that one sprocket, the radius intersecting the mesh starting point for the other sprocket extends through a bottom land of that other sprocket. In other words, the tension side mesh starting points for the two sprockets are out of phase with each other by one half the pitch of the sprockets.

More particularly, in accordance with the invention, a camshaft driving comprises a crankshaft, first and second camshafts, first and second crankshaft sprockets on the crankshaft and a pair of camshaft sprockets, one on each of said camshafts, and means for driving the camshafts from the crankshaft, said driving means comprising first and second endless, flexible, toothed drive elements, the first of said drive elements being disposed on the first crankshaft sprocket and the camshaft sprocket on the first camshaft to drive the first camshaft, and the second of said drive elements being disposed on the second crankshaft sprocket and the camshaft sprocket on the second camshaft for driving the second camshaft, whereby each of said endless, flexible, toothed drive elements has a tension side and a slack side. The crankshaft sprockets are toothed sprockets having top and bottom lands, and are mounted on the crankshaft in relation to each other such that, when the meshing starting point of the first crankshaft sprocket and the tension side of the first drive element is at a top land of the first crankshaft sprocket, the meshing starting point of the second crankshaft sprocket and the tension side of the second drive element is at a bottom land of the second crankshaft sprocket.

Collision between the crankshaft sprocket and the chain takes place at or near the mesh starting point on the tension side. In accordance with the invention, when a collision is taking place between a crankshaft sprocket and one chain at the mesh starting point for that sprocket, a corresponding collision is not taking place at the mesh starting point for the other chain and sprocket. Accordingly, additive or constructive interference of collision noises is avoided.

Further objects, details and advantages of the invention will be apparent from the following detailed description, when read in conjunction with the drawings.

DETAILED DESCRIPTION

Figure 2:
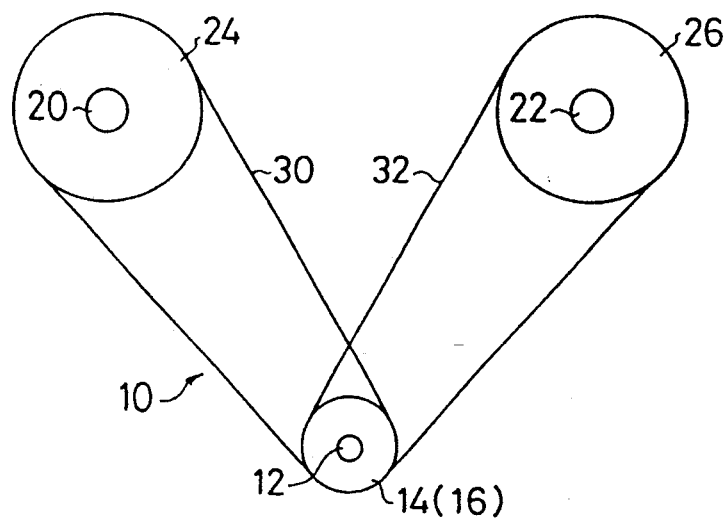
FIGS. 2, 3 and 4 are schematic views showing the layouts of three typical camshaft driving devices to which the invention is applicable.
Figure 3:
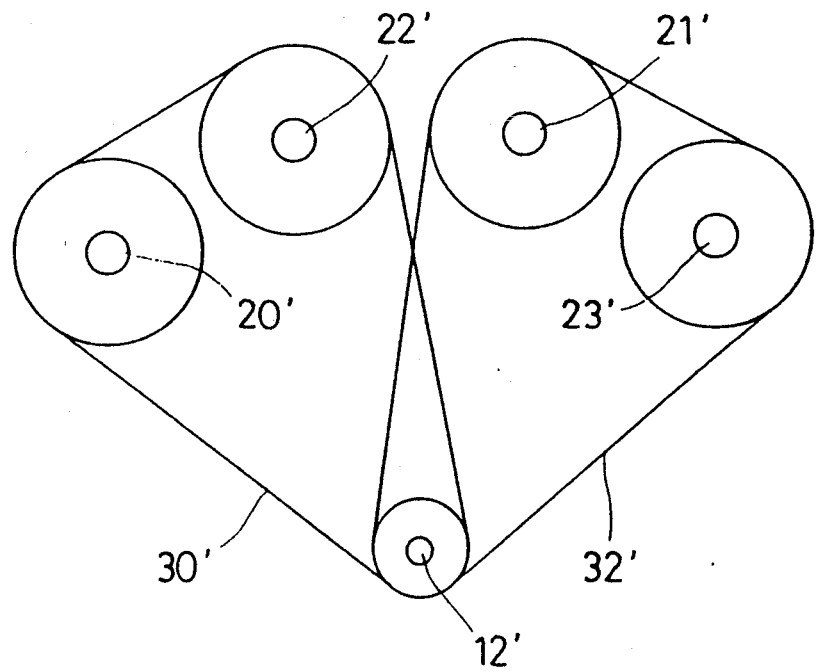
Figure 4:
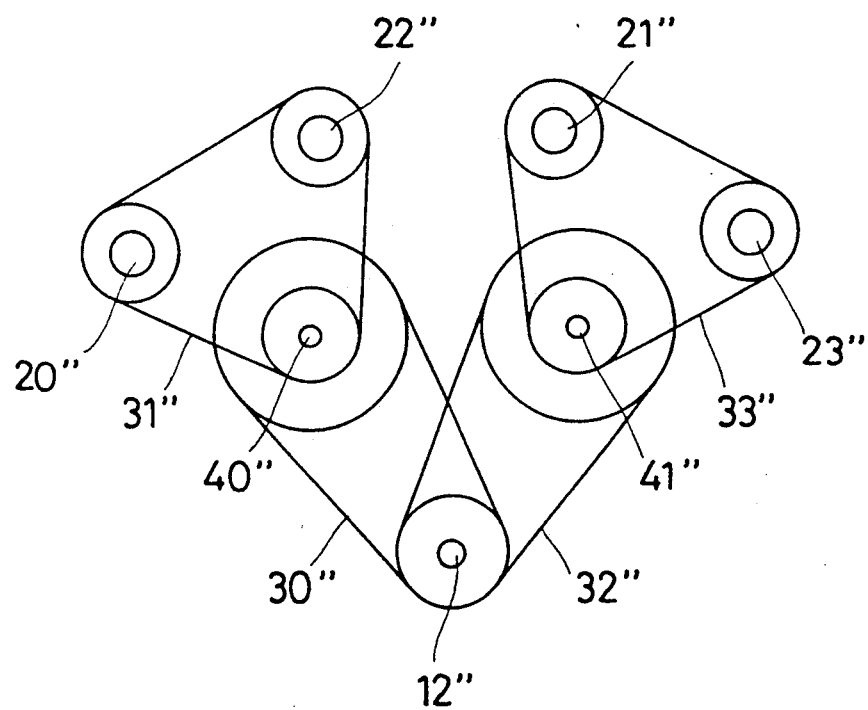

FIGS. 2 to 4 show layouts of the crankshafts and camshafts in several alternative V-type engines.

In FIG. 2, crankshaft 12 drives camshafts 20 and 22 through chains 30 and 32 respectively. Chain 30 is engaged with crankshaft sprocket 14 and camshaft sprocket 24 on camshaft 20. Chain 32 is engaged with crankshaft sprocket 16 and camshaft sprocket 26.

In FIG. 3, which depicts a dual overhead cam engine, crankshaft 12' drives camshafts 20' and 22' through chain 30' and drives camshafts 21' and 23' through chain 32'.

In the dual overhead cam engine of FIG. 4, intermediate shafts 40" and 41" are interposed in the drive train between the crankshaft 12" and the camshafts. Crankshaft 12" drives intermediate shaft 40" through chain 30" and drives intermediate shaft 41" through chain 32". Chain 31", in turn, drives camshafts 20" and 22", and chain 33" drives camshafts 21" and 23".

Referring again to FIG. 2, in the conventional engine, the two crankshaft sprockets 14 and 16 are mounted on the crankshaft 12 in phase with each other for convenience in engine fabrication. Therefore, the relation between the meshing timing for crankshaft sprocket 14 and chain 30 on the one hand, and the meshing timing of crankshaft sprocket 16 and chain 32 on the other, is not taken into consideration. As the crankshaft rotates, the collision sounds produced by the crankshaft sprockets 14 and 16 and chains 30 and 32 ar in phase with each other so that they are additive. The result of the additive or constructive interference of collision sounds is increased overall engine noise.

Figure 1:
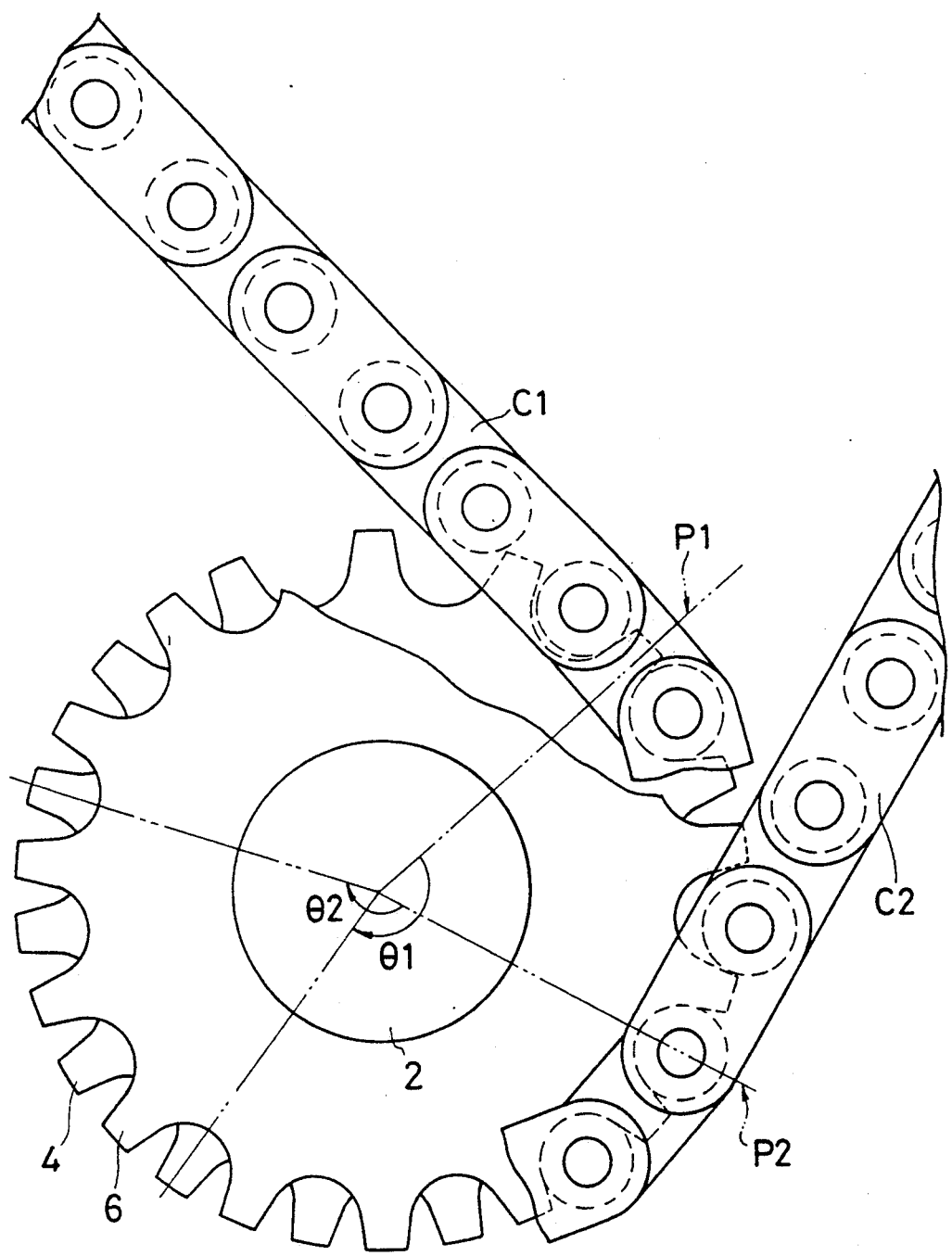
FIG. 1 is fragmentary front elevational view, partly broken away, of a camshaft driving device according to the invention.

FIG. 1, which is an enlarged view showing the peripheries of the crankshaft sprockets, illustrates crankshaft 2 on which a pair of crankshaft sprockets 4 and 6 are coaxially mounted. A chain C1 is installed between crankshaft sprocket 4 and one camshaft sprocket (not illustrated in FIG. 1). A chain C2 is installed between crankshaft sprocket 6 and another camshaft sprocket (not illustrated). Only the tension sides of the two chains are shown, i.e. the sides which are pulled by the crankshaft sprockets as the crankshaft rotates.

The meshing starting point P1 on the tension side of crankshaft sprocket 4 and chain C1 is determined from the wrapping angle $\theta 1$ of the chain on sprocket 4. The wrapping angle is dependent upon the center-to-center distance between the crankshaft and the camshaft (not shown) driven by chain C1, and the diameters of the two sprockets engaged by chain C1. The meshing starting point P2 on the tension side of crankshaft sprocket 6 and chain C2 is determined similarly from wrapping angle $\theta 2$. The meshing starting points P1 and P2 are unchangeable, and, at the locations of these meshing starting points, collisions occur between the crankshaft sprockets 4 and 6 and chains C1 and C2.

With the two sprockets 4 and 6 related to each other as shown in FIG. 1, the meshing starting point P1 of crankshaft sprocket 4 and chain C1 is radially aligned with a top land of crankshaft sprocket 4, while the meshing starting point P2 of crankshaft sprocket and chain C2 is radially aligned with a bottom land of crankshaft sprocket 6. When the crankshaft sprocket has rotated through an angle corresponding to one half the chain pitch from the position illustrated in FIG. 1, the meshing starting point of crankshaft sprocket 4 and chain C1 becomes radially aligned with a bottom land of sprocket 4, and the meshing starting point of crankshaft sprocket 6 and chain C2 comes becomes aligned with a top land of sprocket 6.

In the above-described embodiment, the crankshaft sprockets 4 and 6, which are essentially identical to each other, are mounted on crankshaft 2, in such a way that they are angularly shifted by one-half of the tooth pitch relative to each other. This sets the wrapping angles $\theta 1$ and $\theta 2$ of chains C1 and C2, so that the collisions between sprocket 4 and chain C1 are out of phase with corresponding collisions between sprocket 6 and chain C2, and consequently there is no additive interference between collision sounds, and overall engine noise is reduced.

The principles of the invention, described above with reference to a V-type engine of the type depicted in FIG. 2, are applicable to the V-type dual-cam engines of FIGS. 3 and 4, to horizontally opposed engines, and to various other mechanisms wherein two shafts are driven by separate chains from a single driving shaft. The invention is applicable not only to machinery utilizing chains, but also to machinery utilizing toothed belts or other forms of flexible, endless, toothed drive elements. Other modifications can be made without departing from the scope of the invention as defined in the following claims.

We claim:

1. In a camshaft driving device comprising a crankshaft, first and second camshafts, first and second crankshaft sprockets on the crankshaft and a pair of camshaft sprockets, one on each of said camshafts, and means for driving the camshafts from the crankshaft, said driving means comprising first and second endless, flexible, toothed drive elements, the first of said drive elements being disposed on the first crankshaft sprocket and the camshaft sprocket on the first camshaft to drive the first camshaft, and the second of said drive elements being disposed on the second crankshaft sprocket and the camshaft sprocket on the second camshaft for driving the second camshaft, whereby each of said endless, flexible, toothed drive elements has a tension side and a slack side, wherein the crankshaft sprockets are toothed sprockets having top and bottom lands, and are mounted on the crankshaft in relation to each other such that, when a meshing starting point of said first crankshaft sprocket and the tension side of said first drive element is at a top land of said first crankshaft sprocket, a meshing starting point of said second crankshaft sprocket and the tension side of said second drive element is at a bottom land of said second crankshaft sprocket.

* * * * *